July 4, 1933.  J. ACOSTA  1,916,819

SUGAR MEASURING AND SERVING DEVICE

Filed May 3, 1932

INVENTOR
JOSÉ ACOSTA
BY
ATTORNEY

Patented July 4, 1933

1,916,819

UNITED STATES PATENT OFFICE

JOSÉ ACOSTA, OF NEW YORK, N. Y.

SUGAR MEASURING AND SERVING DEVICE

Application filed May 3, 1932. Serial No. 608,909.

This invention relates to new and useful improvements in a sugar measuring and serving device.

The invention has for an object the construction of an article as mentioned which is characterized by the provision of a cup shaped valve operating between the top of a container and a seat upon a cover upon said container and arranged for discharging a measured quantity of material such as sugar.

The invention still further proposes the mounting of an inverted funnel upon said cup shaped valve and to connect the funnel with a spout upon said cover for the proper discharge of the sugar.

Furthermore, as another object of this invention it is proposed to arrange the parts in a manner so that adjustments may be made for varying according to predetermined desires the amount of sugar dispensed each time.

Furthermore, the invention proposes the construction of a device of the class described which is of simple durable construction, dependable in use and efficient in operation, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
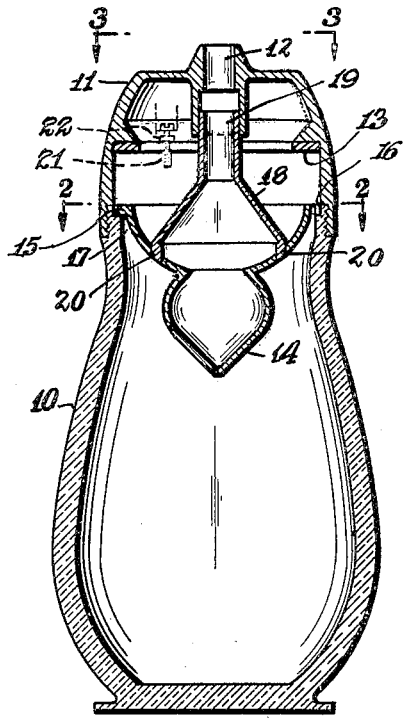
Fig. 1 is a vertical sectional view of a device constructed according to this invention.
Figure 4:
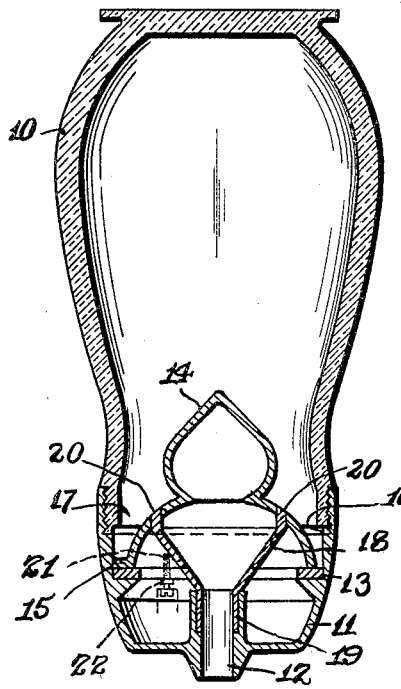
Fig. 4 is a view similar to Fig. 1 but illustrating the device inclined for discharging the sugar.
Figure 5:
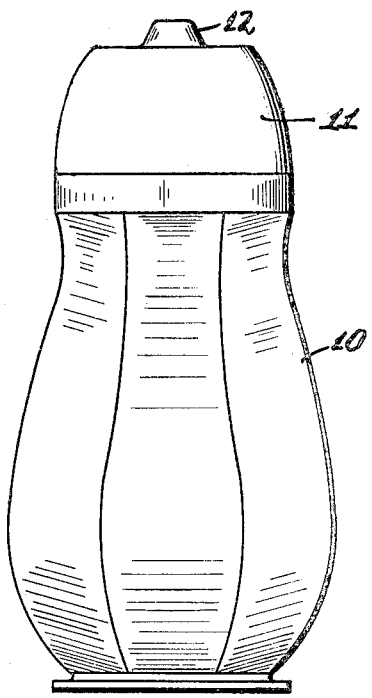
Fig. 5 is an elevational view of the device.
Figure 2:
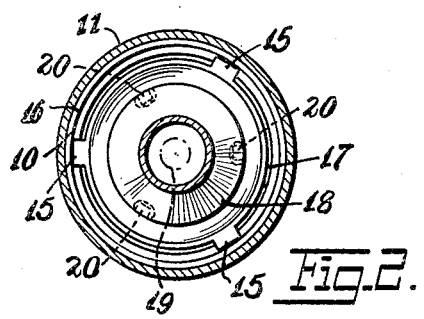
Fig. 2 is a transverse horizontal sectional view taken on the line 2—2 of Fig. 1.
Figure 3:
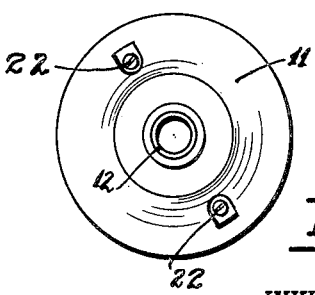
Fig. 3 is a plan view of the device.

The sugar measuring and serving device, according to this invention, comprises a container 10 having an open top upon which a hollow cover 11 threadedly engages. This cover is provided with a discharge spout 12 at its extreme extremity and intermediately and upon its inner wall with a valve seat 13. A cup shaped valve 14 is disposed within the top of the container 10 and is provided with a plurality of projecting lugs 15 engaging a recess 16 arranged around the inner periphery of the container 10. The upper diameter of the cup shaped valve 14 is smaller than the inner diameter of the container providing a passage 17 between these parts through which the sugar may pass. When the cup shaped valve 14 rests upon the top of the container as shown in Fig. 1 it is considered in the open position but when the container is tilted to discharge the sugar the cup shaped valve 14 will move against the seat 13 and close the passage of any additional sugar into the cover 11.

An inverted funnel shaped member 18 is mounted upon the cup shaped valve 14 and has a tubular end 19 engaging slidably within the spout 12. The lower end of the funnel shaped member 18 is provided with lugs 20 engaging in openings in the cup shaped member so as to hold these parts together. A passage exists around the bottom edges of the funnel shaped member of the cup shaped valve so that sugar may pass therebetween. A means is provided for changing the position of the valve seat 13 relative to the top of the container so as to vary the amplitude through which the valve 14 may move and thus regulate the quantity of material dispensed. This means comprises screws 21 rotatively mounted through the cover 11 and threadedly engaging the valve seat 13 which is in the form of a ring arranged within the cover. A flange 22 upon the screws 21 accomplishes the rotative mounting of the screws. The heads of the screws are located outside of the cover so as to be conveniently turned to cause a change in the position of the valve seat.

The operation of the device may be traced by assuming the container 10 empty. It may be loaded with sugar or similar material to be dispensed by removing the cover 11 and then the cup shaped valve 14. Thereafter, these parts are replaced and the device is ready for operation. When it is inverted the material within the container passes through the passage 17 into the cover 11. The amount so passing is limited by reason of the cup shaped valve 14 engaging against its seat 13. Thereafter, when the device is turned back to its original position the cup shaped valve 14 will move down to its original position and the sugar or other material from the cover 11 will pass around the edges of the inverted funnel shaped member 18 and be stored in the cup shaped valve 14 ready for dispensing upon the next inversion of the device. When the device is now inverted the material within the cup shaped valve 14 will be dispensed through the funnel and a fresh fixed quantity will pass through the passage 17 into the cover where it is next discharged into the cup shaped valve 14 when the device is next righted.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout.

2. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout, said cover being threadedly engaged upon the top of said container.

3. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout, said cup shaped valve being limited in motion between the top of said container and said valve seat.

4. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout, the connection between the funnel shaped member and the cup shaped valve comprising lugs projecting from one of these elements and engaging into openings in the container.

5. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout, said valve seat being in the form of a movable ring, and means for holding said ring at various distances from the top of said container for controlling the quantity of discharge.

6. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout, said valve seat being in the form of a movable ring, and means for holding said ring at various distances from the top of said container for controlling the quantity of discharge, said latter means comprising adjustment screws threadedly engaging said ring and rotatively mounted in said cover.

7. A sugar measuring and serving device, comprising a container open at the top, a hollow cover detachably mounted upon the top of the container and having a discharge spout and a valve seat arranged on the inner wall thereof, a cup shaped valve with lugs resting on the top of said container in its open position and adapted to engage against said valve seat in its closed position, and an inverted funnel shaped member fixedly connected with the cup shaped valve and spaced from the inner wall of the cup shaped valve allowing for the passage of material and having a tubular end slidably engaged in said spout, said valve seat being in the form of a movable ring, and means for holding said ring at various distances from the top of said container for controlling the quantity of discharge, said latter means comprising adjustment screws threadedly engaging said ring and rotatively mounted in said cover, said adjustment screws having their heads disposed on the outer side of the cover.

In testimony whereof I have affixed my signature.

JOSÉ ACOSTA.